Feb. 13, 1968 T. H. BABIAN 3,368,270
SHANK TYPE COUPLER AND ADAPTER INSERTER
Filed April 26, 1966 2 Sheets-Sheet 1

INVENTOR.
THEODORE H. BABIAN
BY
Arthur L. Collins
ATTORNEY

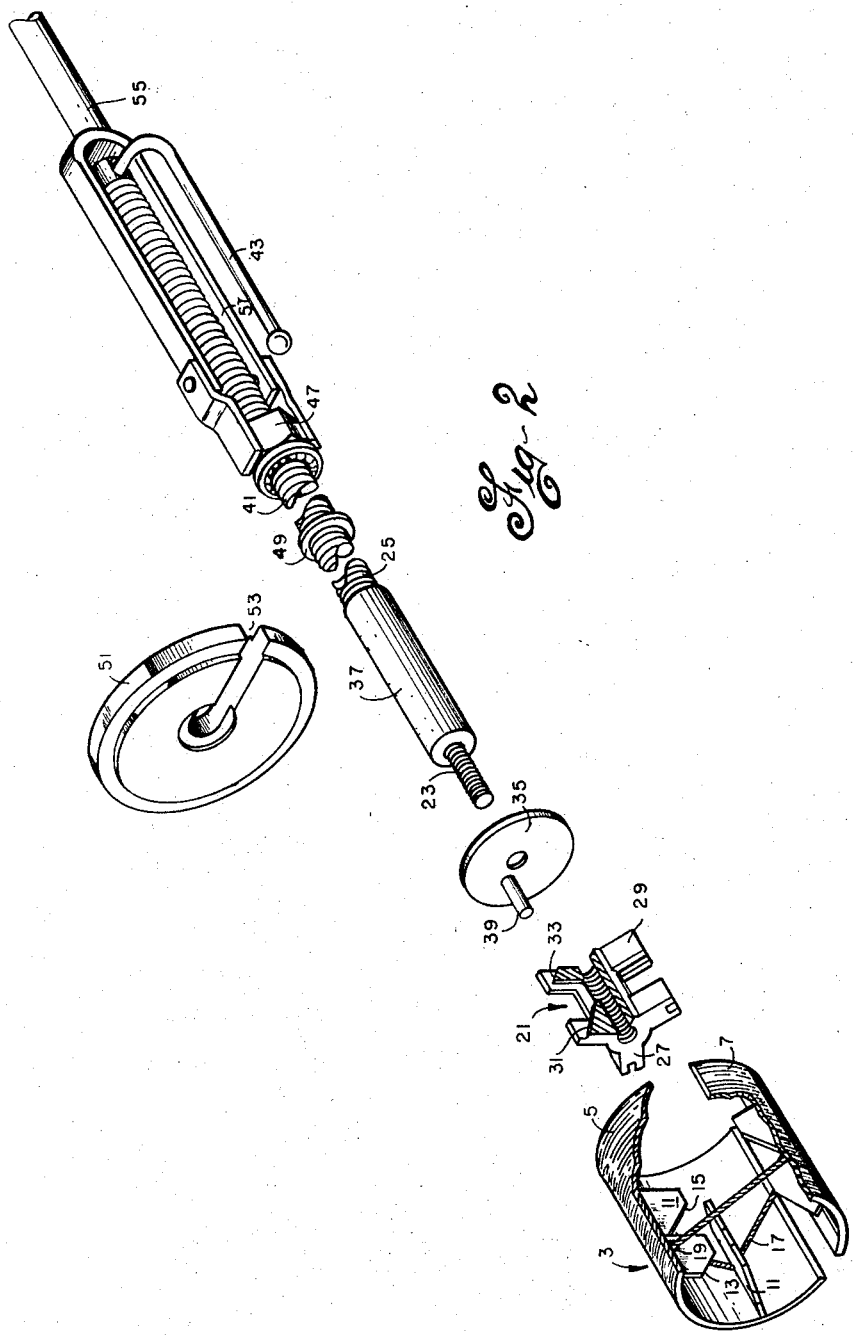

United States Patent Office 3,368,270
Patented Feb. 13, 1968

3,368,270
SHANK TYPE COUPLER AND
ADAPTER INSERTER
Theodore H. Babian, 2822 Welsh Road,
Philadelphia, Pa. 19152
Filed Apr. 26, 1966, Ser. No. 546,145
8 Claims. (Cl. 29—237)

ABSTRACT OF THE DISCLOSURE

The subject invention relates to an improved flexible hose/hose end connector coupling mechanism which includes an expandable mandrel that is inserted into the open end of the hose, a clamping mechanism that engages the exterior surface of the hose opposite the mandrel and a hose end connector engaging mechanism that forces the connector into the end of the hose.

The invention described herein may be manufactured and used by or for the Government of the United States of America for governmental purposes without the payment of any royalties thereon or therefor.

The present invention relates to novel and improved apparatus for inserting a shank type coupling or adapter into the end of a hose.

Present methods of inserting a coupling or adapter into the end of an enlarged heavy section of hose in the field are, in general, inefficient, difficult and hazardous. When the operation has been performed heretofore by hand, one person must hold the coupling in position against the end of the hose with one hand and hold a block of wood or the like against the outer surface of the coupling. With the coupling placed and held in this position, another person must strike the block of wood with a sledge hammer to drive the coupling into the hose. The possibility of personal injury as well as damage to the coupling itself in such an operation are unavoidable. Various types of tools and bench type devices have been devised to facilitate insertion of couplings and adapters into hose but none have been found sufficiently efficient or convenient in use to replace the manual operation.

It is therefore a principal object of the present invention to provide novel and improved apparatus for inserting a coupling or an adapter into the end of a hose in an efficient, convenient and reliable manner.

It is a further object of the present invention to provide novel and improved hose coupling insertion apparatus which is readily portable for use in the field.

Other objects and many of the attendant advantages of this invention will be readily appreciated as the same becomes better understood by reference to the following detailed description when considered in connection with the accompanying drawing wherein:

FIG. 2 is an exploded perspective view of apparatus shown in FIG. 1 with the handles for rotation of the elongated shaft and enlarged pusher plate nut in position for application of the coupling over the end of the shaft.

Figure 1:
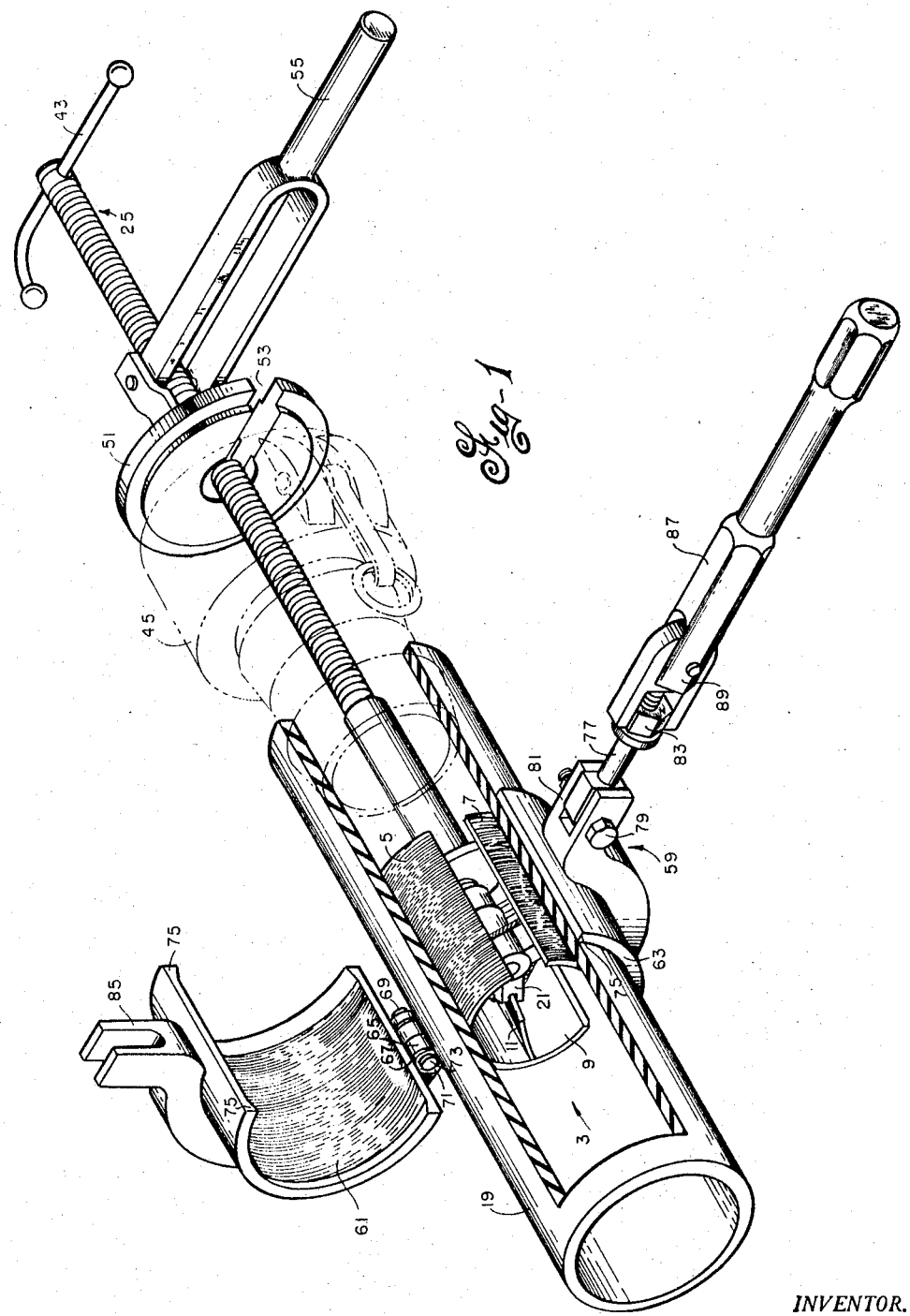
FIG. 1 is a partially cut-away perspective view of a preferred embodiment of the present invention.

Referring now to the various figures of the drawing, it will be noted that the mandril 3 preferably includes the three curvilinear sections or segments 5, 7 and 9. Plate 11 is secured to the internal peripheral surface of segment 5 as shown and extends inwardly radially therefrom. Similar plates extend inwardly from the internal peripheral surfaces of segments 7 and 9. Each of the plates 11 includes the parallel cammed surfaces 13 and 15. Segments 5, 7 and 9 are coupled one to the other by the continuous spring 17 which passes through an aperture 19 in each of the plates 5, 7 and 9. The outer peripheral surface of each of the segments 5, 7 and 9 is serrated so as to improve contact with the interior of the hose 19 when the mandril 3 is expanded.

The mandril lug 21 disposed on the threaded end 23 of the elongated shaft 25 is Y-shaped at its opposite extremities 27 and 29. Slotted ends of each leg of each Y-shaped extremity of the lug 21 are cammed at 31 and 33 to receive and engage the complementary cammed surfaces of plates 11 of the mandril segments in a manner which will be more apparent hereinafter.

The enlarged washer 35 is slidably disposed on the threaded end 23 of shaft 25 and is normally seated on the enlarged diameter unthreaded portion 37 of shaft 25. The offset pin 39 which is integrally secured as shown to washer 35 is adapted to engage the lug 21 between adjacent legs of its Y-shaped extremity 29.

The other end of the shaft 25 is also threaded as at 41. The handle 43 which passes through an aperture in the end of shaft 25 provides a convenient means for rotating the shaft and expanding or contracting the mandril at its opposite end in a manner which will be more apparent hereinafter. Handle 43 is J-shaped as shown so that it can be readily positioned in parallelism with the longitudinal axis of shaft 25 when the coupling 45 is to be applied over the end of the shaft and inserted into the end of hose 19.

The enlarged nut or the like 47 is threadedly disposed on the threaded portion 41 of shaft 25 and is adapted to engage the washer 49 and the annular pusher plate 51 when the coupling 45 is to be forced into the end of the hose 19. The annular pusher plate 51 is slotted as at 53 for convenient application on shaft 25 and is stepped on opposite end surfaces to accommodate the interior of hoses of at least two commonly encountered sizes. The handle 55 is pivotably attached to the nut 47 at its forked extremity 57 so that it too can be aligned on the longitudinal axis of shaft 25 when the coupling 45 is slid over the end of shaft 25 for insertion into the hose 19.

The external hose clamping mechanism 59 includes the semi-cylindrical sections 61 and 63 which are hinged together on the integral interlocking lugs 65 and 67 by the pin 69, washer 71 and cotter pin 73. The inner surfaces of sections 61 and 63 of clamp 59 are serrated and opposite ends of the sections include reduced diameter lips 75 which minimize any tendency of the clamping mechanism 59 to slip over the outer surface of the hose 19.

The locking bolt 77 is pivotably mounted on the pin 79 that extends between juxtaposed legs of the U-shaped lug 81 on the semi-cylindrical section 63 of clamp 59. Bolt 77 is threaded to receive the enlarged nut 83 that engages the outer edges of the U-shaped lug 85 on section 61 of clamp 59 when the clamp is locked in position about hose 19. The handle 87 is pivotably attached to the integral extension of nut 83 at its forked extremity 89 such that the nut may be readily rotated by handle 87 without contact with the peripheral surface of section 61 of clamp 59.

In operation, when coupling 45 is to be inserted into the end of hose 19, the shaft 25 with the mandril assembly threadedly disposed thereon is inserted a predetermined distance into the hose 19. Shaft 25 is then rotated by means of its handle 43 so as to thread the end of shaft 25 into the cammed lug 21. When the shaft 25 has been threaded into lug 21 a predetermined distance, the inner ends of the plates 11 on segments 5, 7 and 9 of the mandril engage the washer 35 which is seated on the enlarged unthreaded portion 23 of shaft 25. Due to the sliding interaction of the cammed surfaces 31 and 33 on the lug 21 and those on plates 11 of segments 5, 7 and 9, continued threading of shaft 25 into lug 21 then causes outward movement of the segments of the mandril into secure contact with the inner peripheral surface of the hose 19. The semi-cylindrical sections 61 and 63 of the external clamping mechanism 59 are then positioned about the exterior surface of the hose 19 opposite the position of the mandril 3 within the hose. The locking bolt 77 of the clamp 59 is then positioned in the slotted lug 85 of clamp section 61 and the enlarged nut 83 is threaded on the bolt by handle 87 until the clamp assembly securely engages the external surface of the hose 19 and anchors the mandril 3 therein. The J-shaped handle 43 on shaft 25 and the handle 55 are then positioned in general alignment with the longitudinal axis of shaft 25 so that coupling 45 can be applied over the end of shaft 25 into engagement with the end of hose 19. The stepped pusher plate 51 is then positioned over the outer end of coupling 45 and the enlarged nut 47 is threaded inwardly on shaft 25 by rotation of handle 55 until the coupling 45 is fully inserted into the hose 19. The pusher plate 51, the external clamp 59 and the mandril assembly 3 are then removed and any suitable conventional hose band or clamp not shown on the drawing is then applied about the end of the hose 19 to secure the coupling therein.

Obviously, many modifications and variations of the present invention are possible in the light of the above teachings. It is therefore to be understood that within the scope of the appended claims, the invention may be practiced otherwise than as specifically described.

What is claimed is:

1. Apparatus for inserting a coupling into the end of a hose, said apparatus comprising:
   (a) an elongated threaded shaft with first and second ends;
   (b) a mandril coupled to the first end of the shaft;
   (c) means for securely engaging the exterior peripheral surface of the hose opposite the position of the mandril therein;
   (d) a circular pusher plate;
   (e) and means threadedly disposed on the shaft for engaging the pusher plate and inserting the coupling into the end of the hose.

2. The apparatus substantially as described in claim 1 and further including means for expanding and contracting the mandril on rotation of the shaft.

3. The apparatus substantially as described in claim 1 wherein the means for engaging the exterior surface of the hose is a hinged clamp.

4. The apparatus substantially as described in claim 2 wherein the means for engaging the exterior surface of the hose is a hinged clamp.

5. The apparatus substantially as described in claim 1 wherein the circular pusher plate is stepped so as to engage the upper and inner peripheral edges of the coupling when it is positioned on the shaft for engaging the interior of the hose for insertion into the hose.

6. The apparatus substantially as described in claim 1 wherein handle means are disposed at the second end of the shaft to facilitate rotation thereof.

7. The apparatus substantially as described in claim 6 wherein the pusher plate engaging means also includes a handle that facilitates rotation thereof on the threaded shaft.

8. The apparatus substantially as described in claim 7 wherein the handle means for the threaded shaft and the handle for the pusher plate engaging means are coupled to the shaft so that they may be positioned in parallelism with the shaft so that the coupling can be positioned over the shaft for engagement with the end of the hose.

References Cited
UNITED STATES PATENTS

| 1,094,978 | 4/1914 | Church | 29—237 |
| 1,848,867 | 3/1932 | Callaway | 29—237 |
| 2,341,677 | 2/1944 | Wass | 29—265 |
| 3,055,093 | 9/1962 | Ruble | 29—265 |

OTHELL M. SIMPSON, *Primary Examiner.*

WILLIAM FELDMAN, *Examiner.*

J. C. PETERS, *Assistant Examiner.*